United States Patent
Kim et al.

(10) Patent No.: US 6,901,269 B2
(45) Date of Patent: May 31, 2005

(54) APPARATUS AND METHOD FOR CONTROLLING TRANSMISSION POWER OF CDMA MOBILE COMMUNICATION SYSTEM

(75) Inventors: Jong-Soo Kim, Seoul (KR); Byung-Sek Yun, Seoul (KR)

(73) Assignee: UTStarcom, Alameda, CA (US)

( * ) Notice: Subject to any disclaimer, the term of this patent is extended or adjusted under 35 U.S.C. 154(b) by 518 days.

(21) Appl. No.: 09/855,896

(22) Filed: May 15, 2001

(65) Prior Publication Data

US 2001/0055979 A1 Dec. 27, 2001

(30) Foreign Application Priority Data

May 19, 2000 (KR) ........................................ 2000-27034

(51) Int. Cl.[7] .............................................. H04Q 2/20
(52) U.S. Cl. ...................... 455/522; 455/7; 455/11.1; 455/69
(58) Field of Search .......................... 455/522, 69, 126, 455/7, 11.1

(56) References Cited

U.S. PATENT DOCUMENTS

| | | | |
|---|---|---|---|
| 5,896,064 A | * 4/1999 | Kaku | 330/279 |
| 6,144,860 A | 11/2000 | Komatsu | 455/522 |
| 6,151,328 A | 11/2000 | Kwon et al. | 370/441 |
| 6,175,744 B1 | 1/2001 | Esmailzadeh et al. | 455/522 |
| 6,181,949 B1 | 1/2001 | Ozluturk et al. | 455/522 |
| 6,389,296 B1 | * 5/2002 | Shiraki et al. | 455/522 |
| 2002/0193115 A1 | * 12/2002 | Furukawa et al. | 455/442 |

* cited by examiner

*Primary Examiner*—Nick Corsaro
*Assistant Examiner*—Alan T. Gantt
(74) *Attorney, Agent, or Firm*—McDonnell Boehnen Hulbert & Berghoff LLP

(57) ABSTRACT

An apparatus and method for controlling a transmission power of a base transceiver station in a CDMA mobile communication system is disclosed. The apparatus for controlling a transmission power in a CDMA mobile communication system, including: a central processing unit (CPU) for performing control operation according to a power control require signal of a user; a gain controller for outputting a gain signal according to the CPU control; and a gain variable amplifier for regulating transmission power by varying according to the gain signal of the gain controller.

17 Claims, 2 Drawing Sheets

APPARATUS AND METHOD FOR CONTROLLING TRANSMISSION POWER OF CDMA MOBILE COMMUNICATION SYSTEM

FIELD OF THE INVENTION

The present invention relates to a code division multiple access (CDMA) mobile communication system; and, more particularly, to an apparatus and method for controlling transmission power of a CDMA mobile communication system, which can regulate the transmission power based on a power control command.

DESCRIPTION OF THE PRIOR ART

In a code division multiple access (CDMA) mobile communication, an additional repeater or a base transceiver station subsystem (hereinafter, referred to as a BTS) is established to increase communication quality or to solve a shade region problem.

Transmission power of the BTS is regulated and operated in the beginning of system establishment so, in case of installing the additional repeater or BTS, the transmission power of the current operating BTS may be re-regulated.

However, during the re-regulating period, the BTS cannot provide communication services, which makes users inconvenient. Moreover, the re-regulating operation is usually performed manually. An operator regulates the transmission power of the BTS manually by using a measuring equipment, however in this case, an accurate power regulating is difficult and regulating time is prolonged.

Therefore, when the transmission power of the BTS is regulated manually, there are disadvantages in that system efficiency is decreased and service interrupt time is long.

SUMMARY OF THE INVENTION

It is, therefore, an object of the present invention to provide an apparatus and method for controlling a transmission power of a CDMA mobile communication system, which can regulate the transmission power by using a command, in case of establishing an additional repeater or BTS.

To achieve the above object, in the present invention, a base power is set up, when an additional repeater is established, or the established repeater is removed and an additional BTS is established, all transmission power of the BTS is regulated by using an operator command.

In accordance with an aspect of the present invention, there is provided an apparatus for controlling a transmission power in a CDMA mobile communication system, including: a central processing unit (CPU) for performing control operation according to a power control require signal of a user; a gain controller for outputting a gain signal according to the CPU control; and a gain variable amplifier for regulating transmission power by varying according to the gain signal of the gain controller.

In accordance with another aspect of the present invention, there is provided a method for controlling a transmission power control in a CDMA mobile communication system, comprising the steps of: a) regulating a transmission power of a base transceiver station (BTS) to 0 dB; b) checking whether a power control request of an operator exists or not; c) determining whether the power control request of the operator is a first power control or a second power control; and d) re-regulating the transmission power of the BTS by varying a gain of an amplifier according to the determining result.

BRIEF DESCRIPTION OF THE DRAWINGS

Other objects and aspects of the invention will become apparent from the following description of the embodiments with reference to the accompanying drawings, in which.

DETAILED DESCRIPTION OF THE PREFERRED EMBODIMENTS

Hereinafter, a transmission power control circuit of a CDMA mobile communication system according to the present invention will be described in detail referring to the accompanying drawings.

A power control circuit of the BTS includes a modulating and amplifying block, which modulates and amplifies a base band signal to an intermediate frequency signal, a block of modulating the intermediate frequency signal to a radio frequency (RF), a power amplifier and a band pass filter.

Each of the blocks has gain for amplifying the base band signal so that total transmission power is generated, but the gain of each block and power amplifier have some margin, so any one block may control the whole transmission power.

The block of varying and amplifying the base band signal to the intermediate frequency signal undertakes the above-referenced role, so in case of establishing an additional repeater, the transmission power has to be re-regulated.

In the present invention, a base power is set up, and then all transmission power of the BTS is regulated in accordance with an operator command when an additional repeater is established, or the established repeater is removed and an additional BTS is established.

Figure 1:
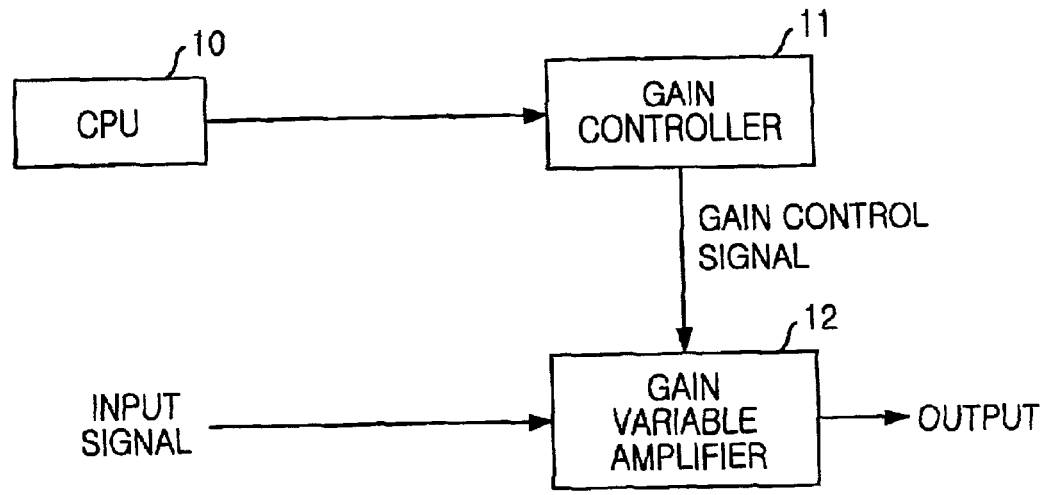
FIG. 1 is a block diagram illustrating a transmission power control circuit of a CDMA mobile communication system in accordance with the present invention.
Figure 2:
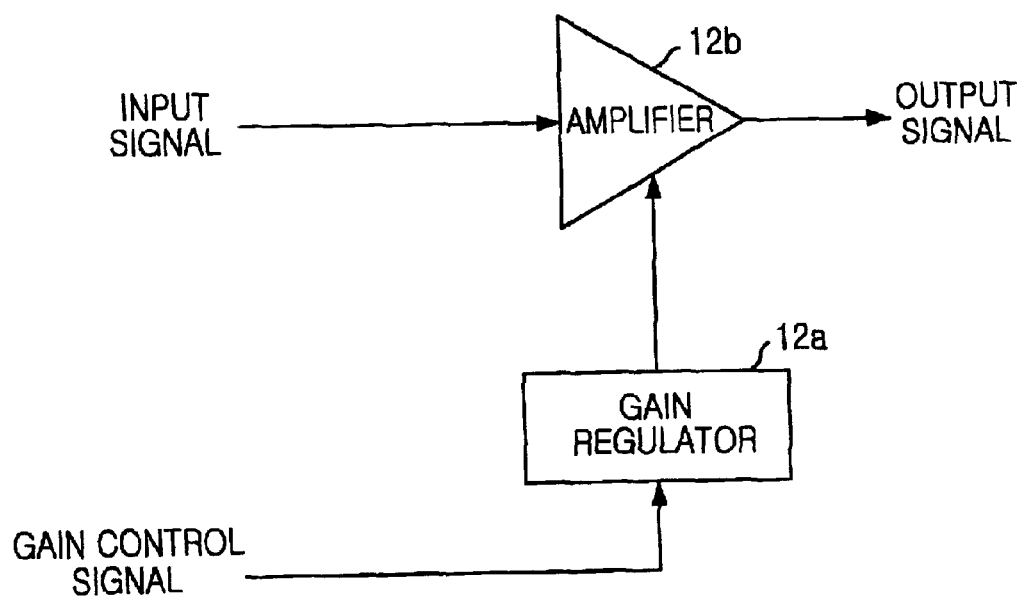
FIG. 2 is a diagram showing a gain variable amplifier in FIG. 1.
Figure 3:
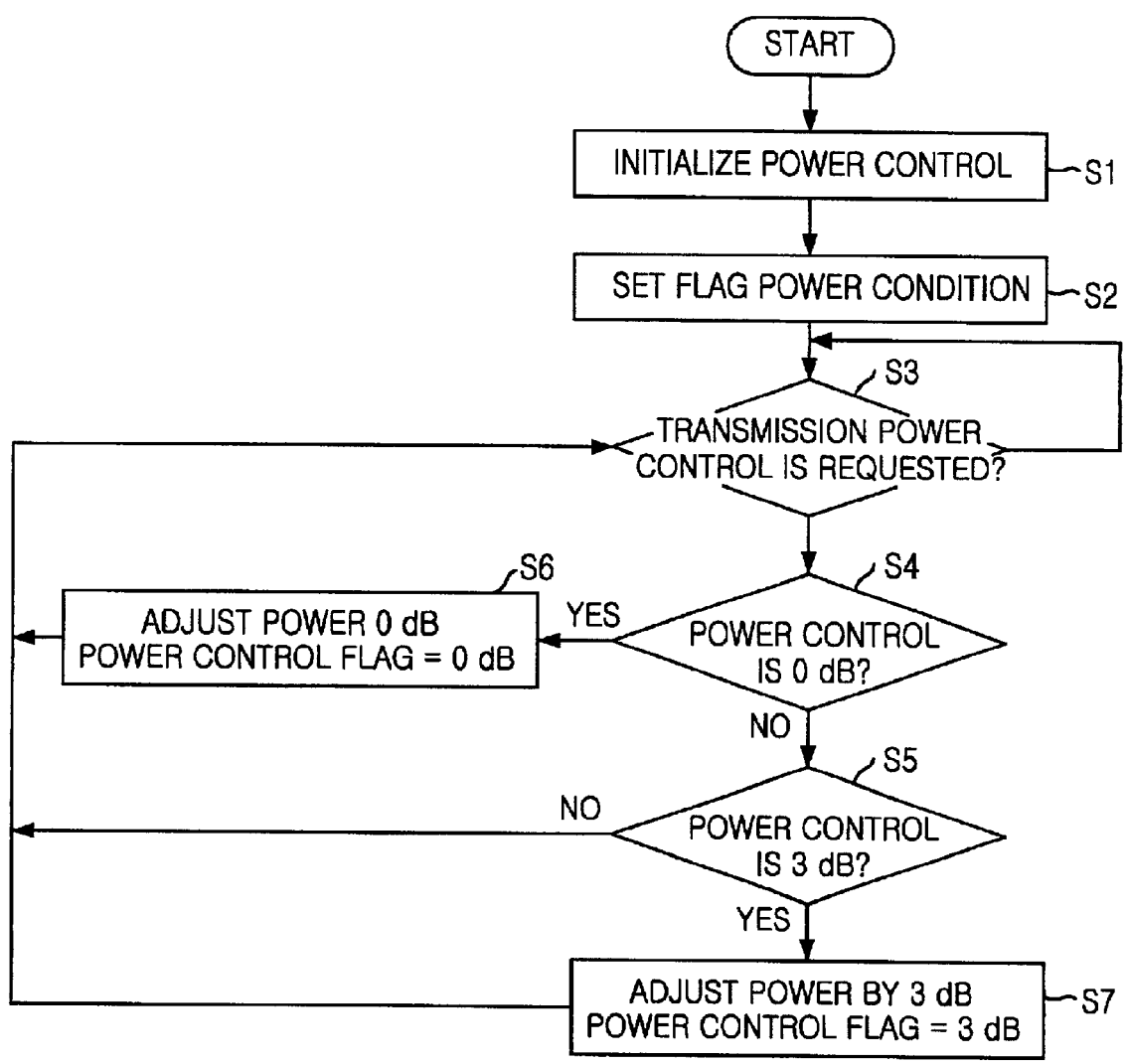
FIG. 3 is a flow chart showing a transmission power re-regulate operation of BTS in FIG. 1.

FIG. 1 is a block diagram illustrating a transmission power control circuit of a CDMA mobile communication system in accordance with the present invention. Referring to FIG. 1, the transmission power control circuit includes a CPU 10 for generating a power control signal based on a command from the operator, a gain controller 11 for outputting a gain signal according to the control signal from the CPU 10 control and a gain variable amplifier 12 for regulating the transmission power by varying the gain to 0 dB or 3 dB according to the gain signal of the gain controller 11.

The gain variable amplifier includes a gain regulator 12a and a gain variable amplifier 12b. The gain regulator 12a regulates a gain of the gain variable amplifier 12b to 0 dB or 3 dB, according to the gain control signal of the gain controller 11.

That is, when the repeater is used, the gain regulator 12a regulates the gain of the gain variable amplifier 12b to 0 dB, otherwise, regulates it to 3 dB.

When using the repeater, a two-way filter is used thereby decreasing the gain about 3 dB. In order to maintain the transmission power of BTS as much as before, the gain should be increased about 3 dB. However, if another additional device except the repeater is established, gain-regulating value of the gain regulator 12a may be changed.

An operation of the transmission power control circuit of the BTS in accordance with the present invention will be described.

When the transmission power control circuit of the BTS is initialized, the CPU 10 operates the gain controller 11 to perform a power control initializing operation at step S1 which regulates the transmission power of the BTS to 0 dB, and sets power condition flag to "0" at step S2, which represents that the gain of the gain variable amplifier 12b is set to 0 dB.

That is, according to the control signal from the CPU 10, the gain controller 11 outputs a gain control signal for setting the gain of the amplifier 12b to 0 dB, and according to the gain control signal, the gain regulator 12a of the gain variable amplifier 12 controls the gain of the gain variable amplifier 12b to 0 dB, thereby the power being controlled.

When an additional repeater is established, or an established repeater is removed and another additional repeater is established, the operator re-regulates the power of the BTS by using a power control command. The power control command is inputted to the CPU 10 through an interprocessor communication (IPC), so the CPU 10 outputs a power control signal, which corresponds to the inputted power control command, to the gain controller 11.

The CPU 10 checks whether a power control request from the operator exists or not at step S3, and if the power control request does not exist, then maintains current status and repeats the step S3.

If the power control request from the operator exists, then the CPU 10 checks whether the power control request is 0 dB power control or 3 dB power control at steps S4 and S5.

Since gain of the gain variable amplifier 12b is to be regulated from 0 dB to 3 dB when a repeater is additionally established, the gain of the gain variable amplifier 12b is to be regulated from 3 dB to 0 dB when an additional repeater is established after removing the installed repeater.

Also, according to the checking result, the CPU 10 outputs the power control signal to the gain controller 11 then, sets a corresponding power control flag to "0" or "1" at steps S5 and S6. At this time, the power control flag "1" means the gain of the gain variable amplifier 12b is set to 3 dB. Therefore, according to the power control signal, the gain controller 11 outputs the gain control signal to the gain variable amplifier 12, and according to the gain control signal, the gain regulator 12a regulates the gain of the gain variable amplifier 12b to 0 dB or 3 dB, such that the gain variable amplifier 12b controls power with 0 dB or 3 dB gain.

In the present invention, a base power is set up, and then all transmission power of the BTS is regulated in accordance with an operator command when an additional repeater is established, or the established repeater is removed and an additional BTS is established. As a result, the present invention may minimize a service interrupt period, which is caused by re-regulating of transmission power, and increase reliability and efficiency of the system.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for controlling a transmission power of a base transceiver station (BTS) in a CDMA mobile communication system, comprising:

a central processing unit (CPU) for receiving a command to perform a power control operation and for generating power control signal in response to the establishment or removal of a repeater;

a gain controller for outputting a gain signal in accordance with the CPU power control signal; and a gain variable amplifier for regulating the entire transmission power of the BTS by varying its gain according to the gain signal of the gain controller.

2. The apparatus as recited in claim 1, wherein the gain variable amplifier varies its gain to 0dB, according to the gain signal.

3. The apparatus as recited in claim 1, wherein the gain variable amplifier includes:

a gain regulator for varying gain according to the gain control signal outputted from the gain controller; and an amplifier for amplifying the transmission power according to the gain outputted from the gain regulator.

4. The apparatus of claim 1 wherein the CPU receives said command from an operator via an interprocessor communication.

5. The apparatus of claim 1 wherein the gain variable amplifier is a component of a baseband to intermediate frequency conversion block.

6. A method for controlling a transmission power control of a base transceiver station (BTS) in a CDMA mobile communication system, comprising the steps of:

a. Regulating a transmission power of a base transceiver station (BTS) to 0dB;

b. at the BTS, checking whether a power control request of an operator was received, and if so;

c. at the BTS, determining whether the power control request received from the operation is a first power control or a second power control; and d. at the BTS, re-regulating the transmission power of the BTS by varying a gain of an amplifier according to the determining result.

7. The method as recited in claim 6, wherein a gain of the first power control is 0dB and a gain of the second power control is 3dB.

8. A method for controlling a transmission power control of a base transceiver station (BTS) in a CDMA mobile communication system, comprising the steps of:

configuring a BTS to use a repeater, thereby decreasing a transmit signal power by approximately 3dB;

automatically re-regulating the BTS transmit power by configuring a variable amplifier to increase the gain by approximately 3dB; and wherein the re-regulating step is performed to minimize a service interrupt period.

9. The method of claim 8 wherein the decrease in the transmit signal power is due to the use of a two-way filter.

10. The method of claim 8 wherein the step of re-regulating the BTS transmit power is performed in response to an operator command.

11. The method of claim 8 wherein the variable amplifier includes a gain regulator.

12. The method of claim 8 wherein the variable amplifier is configured using a gain controller.

13. The method of claim 8 wherein the variable amplifier includes a gain regulator.

14. The method of claim 8 wherein the variable amplifier is configured using a gain controller.

15. A method for controlling a transmission power control of a base transceiver station (BTS) in a CDMA mobile communication system, comprising the steps of:

configuring a BTS to remove an established repeater, thereby increasing a transmit signal power by approximately 3dB;

automatically re-regulating the BTS transmit power by configuring a variable amplifier to decrease the gain by approximately 3dB; and wherein the re-regulating step is performed to minimize a service interrupt period.

16. The method of claim 15 wherein the increase in the transmit signal power is due to the removal of a two-way filter.

17. The method of claim 15 wherein the step of re-regulating the BTS transmit power is performed in response to an operator command.

\* \* \* \* \*